United States Patent
Tellkamp et al.

(10) Patent No.: US 9,977,148 B2
(45) Date of Patent: May 22, 2018

(54) METHOD FOR SYNCHRONIZING A LIGHT GRID

(71) Applicant: Pilz Auslandsbeteiligungen GmbH, Ostfildern (DE)

(72) Inventors: Friedjof Tellkamp, Bad Ragaz (CH); Massimo Maffioli, Bad Ragaz (CH); Christoph Werner, Bad Ragaz (CH); Gerhard Braun, Bad Ragaz (CH)

(73) Assignee: PILZ AUSLANDSBETEILIGUNGEN GMBH, Ostfildern (DE)

( * ) Notice: Subject to any disclaimer, the term of this patent is extended or adjusted under 35 U.S.C. 154(b) by 208 days.

(21) Appl. No.: 14/757,409

(22) Filed: Dec. 23, 2015

(65) Prior Publication Data
US 2016/0116634 A1 Apr. 28, 2016

Related U.S. Application Data

(63) Continuation of application No. PCT/EP2014/063037, filed on Jun. 20, 2014.

(30) Foreign Application Priority Data

Jun. 28, 2013 (DE) .......................... 10 2013 106 785

(51) Int. Cl.
*G01V 8/20* (2006.01)

(52) U.S. Cl.
CPC ....................................... *G01V 8/20* (2013.01)

(58) Field of Classification Search
CPC ................................ G08B 13/183; G01V 8/10
See application file for complete search history.

(56) References Cited

U.S. PATENT DOCUMENTS

| 5,130,532 A | 7/1992 | Clemens |
| 2009/0129784 A1 | 5/2009 | Carnicelli et al. |
| 2012/0068055 A1* | 3/2012 | Burger ..................... G01V 8/20 250/221 |

FOREIGN PATENT DOCUMENTS

| CN | 101910911 | 12/2010 |
| CN | 103048697 | 4/2013 |
| DE | 38 03 033 A1 | 8/1989 |

(Continued)

OTHER PUBLICATIONS

English Machine Translation of EP1790999.*

(Continued)

*Primary Examiner* — Renee Chavez
(74) *Attorney, Agent, or Firm* — Harness, Dickey & Pierce, P.L.C.

(57) ABSTRACT

A method for synchronizing a light grid comprising a transmitting unit having a plurality of transmitters and a receiving unit having a plurality of receivers. A transmitter control unit activates the transmitters one after another in a cycle, and a receiver control unit evaluates the receivers. Each transmitter is associated with a receiver, and an activated transmitter transmits a transmission beam to its associated receiver. At least two transmission beams in the cycle are synchronization transmission beams which are emitted at a time offset from one another. The receiver control unit measures the time offset, and the synchronization transmission beams are uniquely associated with the totality of the transmission beams in the cycle on the basis of the time offset.

2 Claims, 5 Drawing Sheets

(56)  References Cited

FOREIGN PATENT DOCUMENTS

| | | |
|---|---|---|
| DE | 195 10 304 C1 | 2/1996 |
| DE | 10 2005 047 776 A1 | 4/2007 |
| DE | 10 2005 056 000 A1 | 5/2007 |
| DE | 10 2007 059 565 B4 | 6/2009 |
| DE | 10 2009 012 906 A1 | 9/2010 |
| EP | 1 790 999 A2 | 5/2007 |
| EP | 1 933 173 A1 | 6/2008 |
| EP | 2 071 363 | 6/2009 |
| EP | 2 431 768 A1 | 3/2012 |
| EP | 2 463 678 A1 | 6/2012 |
| EP | 1 772 753 A1 | 8/2012 |
| WO | 2011/018769 | 2/2011 |

OTHER PUBLICATIONS

Bai, Lin-jing et al.; The Development of the LDKS Type Grating Sensor for Intellectualized Vehicle Separation; Aug. 2008; 4 pp.
Chinese Examination Report; Dec. 28, 2016; 12 pp.
English language translation of International Preliminary Report on Patentability (Chapter I) for PCT/EP2014/063037; 14 pp.
International Search Report for PCT/EP2014/063037; dated Dec. 29, 2015; 12 pp.

* cited by examiner

| M | N | Position of the synchronization transmission beams |
|---|---|---|
| 1 | 0 | 0 |
| 2 | 1 | 0 1 |
| 3 | 3 | 0 1 3 |
| 4 | 6 | 0 1 4 6 |
| 5 | 11 | 0 1 4 9 11<br>0 2 7 8 11 |
| 6 | 17 | 0 1 4 10 12 17<br>0 1 4 10 15 17<br>0 1 8 11 13 17<br>0 1 8 12 14 17 |
| 7 | 25 | 0 1 4 10 18 23 25<br>0 1 7 11 20 23 25<br>0 1 11 16 19 23 25<br>0 2 3 10 16 21 25<br>0 2 7 13 21 22 25 |
| 8 | 34 | 0 1 4 9 15 22 32 34 |
| 9 | 44 | 0 1 5 12 25 27 35 41 44 |
| 10 | 55 | 0 1 6 10 23 26 34 41 53 55 |
| 11 | 72 | 0 1 4 13 28 33 47 54 64 70 72<br>0 1 9 19 24 31 52 56 58 69 72 |
| 12 | 85 | 0 2 6 24 29 40 43 55 68 75 76 85 |
| 13 | 106 | 0 2 5 25 37 43 59 70 85 89 98 99 106 |
| 14 | 127 | 0 4 6 20 35 52 59 77 78 86 89 99 122 127 |
| 15 | 151 | 0 4 20 30 57 59 62 76 100 111 123 136 144 145 151 |
| 16 | 177 | 0 1 4 11 26 32 56 68 76 115 117 134 150 163 168 177 |
| 17 | 199 | 0 5 7 17 52 56 67 80 81 100 122 138 159 165 168 191 199 |
| 18 | 216 | 0 2 10 22 53 56 82 83 89 98 130 148 153 167 188 192 205 216 |
| 19 | 246 | 0 1 6 25 32 72 100 108 120 130 153 169 187 190 204 231 233 242 246 |
| 20 | 283 | 0 1 8 11 68 77 94 116 121 156 158 179 194 208 212 228 240 253 259 283 |
| 21 | 333 | 0 2 24 56 77 82 83 95 129 144 179 186 195 255 265 285 293 296 310 329 333 |
| 22 | 356 | 0 1 9 14 43 70 106 122 124 128 159 179 204 223 253 263 270 291 330 341 353 356 |
| 23 | 372 | 0 3 7 17 61 66 91 99 114 159 171 199 200 226 235 246 277 316 329 348 350 366 372 |
| 24 | 425 | 0 9 33 37 38 97 122 129 140 142 152 191 205 208 252 278 286 326 332 353 368 384 403 425 |
| 25 | 480 | 0 12 29 39 72 91 146 157 160 161 166 191 207 214 258 290 316 354 372 394 396 431 459 467 480 |
| 26 | 492 | 0 1 33 83 104 110 124 163 185 200 203 249 251 258 314 318 343 356 386 430 440 456 464 475 487 492 |

Fig.4

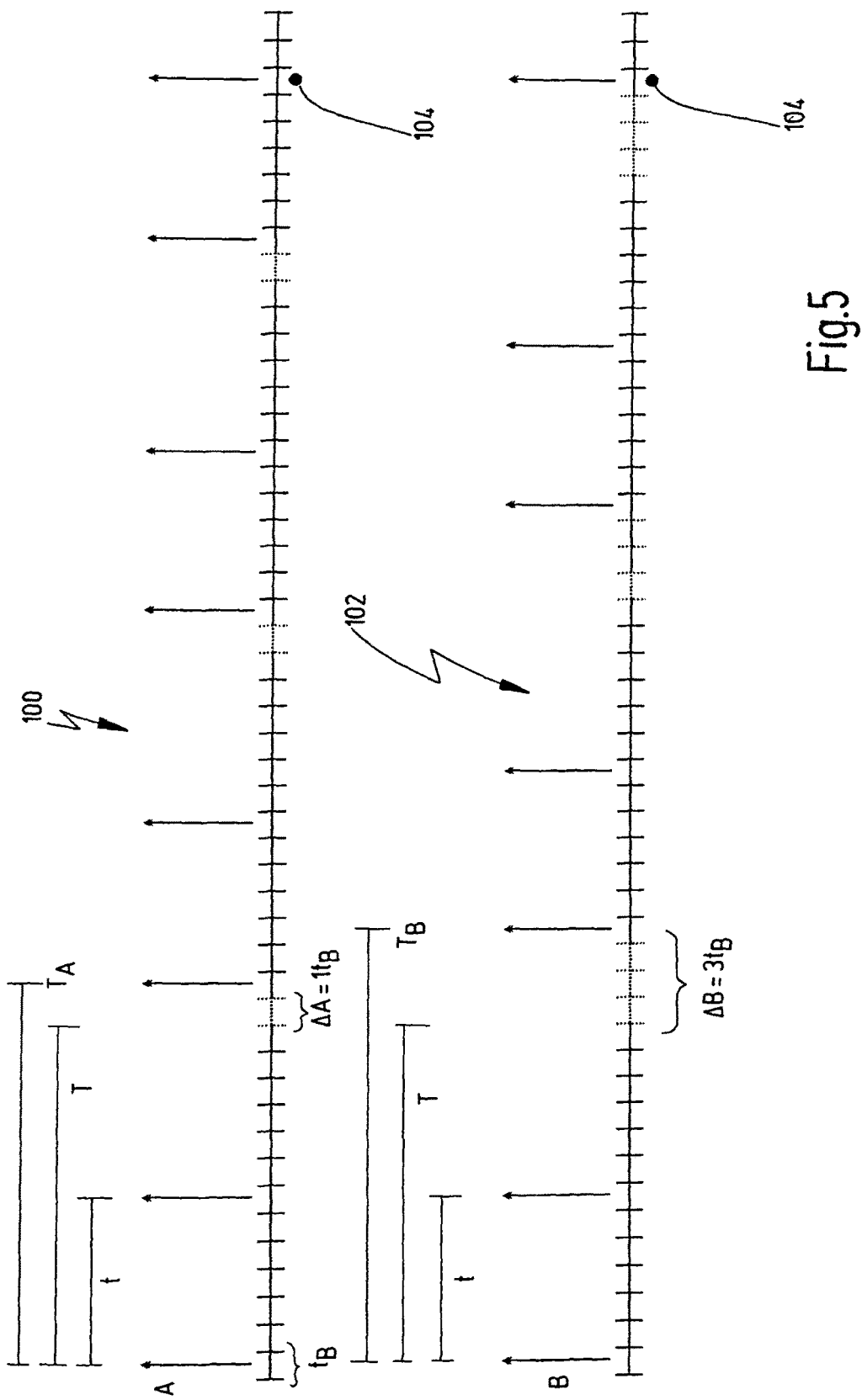

METHOD FOR SYNCHRONIZING A LIGHT GRID

CROSS REFERENCES TO RELATED APPLICATIONS

This application is a continuation of international patent application PCT/EP2014/063037, filed on Jun. 20, 2014 designating the U.S., which international patent application has been published in German language as WO 2014/206886 A1 and claims priority from German patent application DE 10 2013 106 785, filed on Jun. 28, 2013. The entire contents of these priority applications are incorporated herein by reference.

BACKGROUND OF THE INVENTION

The present invention relates to a method for synchronization of a light grid and to a light grid based on this method.

The invention generally relates to the field of machine safety in the sense of protecting persons and/or material values against dangers which result from automatically operating systems or machines, for example automatically operated robots. As a typical protective measure the danger zone around f such a system is secured so that entering the danger zone is either prevented or leads to the dangerous operating mode being halted, switched off, or otherwise defused. To secure such a danger zone, frequently mechanical safety fences or safety doors are used. However, in many cases it is necessary to access the protected danger zone, whether because an operator regularly needs to access the machine and/or because material must be transported into or out of the danger zone. Optoelectronic protection devices are frequently used for such instances, in particular light grids or light curtains.

Light grids comprise a transmitting unit with a plurality of individual transmitters which transmit the transmission beams to a receiving unit at a distance. The receiving unit has a plurality of receivers, in which a transmitter of the transmitting unit is respectively assigned a receiver in the receiving unit which together form a transmitter/receiver pair. The transmission beams usually run in parallel to each other between the transmitters and the receivers and thereby span a protective field which represents the region to be monitored. If one of the transmission beams is interrupted, for instance, by a body part of a person, said interruption can be detected with the aid of the receivers, and the system to be protected can be halted or switched off.

Light grids are typically used in a scanning mode, that is to say the individual transmitter/receiver pairs are cyclically activated one after another in a scanning direction so that only one transmitter/receiver pair is active at a point in time. A precondition for the scanning mode is that the transmitter control unit and the receiver control unit of the transmitting and receiving unit can be synchronized in terms of time with one another so that an associated receiver can be activated synchronously to a transmitter. However, since the transmitting and receiving units are at a distance from one another, there is generally no electric coupling, for example by cable or radio, between the two units. The synchronization is performed in said instances in an optical fashion via the transmission beams.

DE 195 10 304 C1 shows such a light grid in which the synchronization is performed in an optical fashion, wherein an individual transmitter/receiver pair being used for the synchronization of the remaining transmitter/receiver pairs. The transmitter of said transmitter/receiver pair emits a synchronization beam which is different from the other transmission beams. The associated receiver is constantly activated. Once the receiver receives the synchronization beam, the cyclic activation of the downstream receivers begins from said receiver. The light grid can therefore be newly synchronized after each pass through the scanning cycle.

In many operations, the protective field of a light grid extends further than the region actually to be monitored. For example, fixed machine parts may be located within the protective field yet said parts should not trigger the safety function. Likewise, other none safety-critical objects may be inserted into the machine such as workpieces, which likewise should not lead to a shutdown off of the system. In order to adapt the protective field to the safety-critical regions, subregions of the protective field are frequently defined as so called blanking or muting regions in which detection of an object should not trigger the safety function. In other words, individual transmitter and receiver pairs are selectively eliminated in subregions, either permanently (blanking) or only for short periods (muting).

In order to be able to use a light grid flexibly, and since it is generally not known before the installation of the light grid which regions are to be defined as blanking regions, it is desirable for the light grid to be designed so that all the transmitter/receiver pairs are suitable for blanking. However, at the same time synchronization in an optical fashion should be feasible. A light grid according to DE 195 10 304 C1, a predefined transmitter/receiver pair is used for the synchronization. If said transmitter/receiver pair is eliminated because of blanking, synchronization is not possible.

DE 10 2005 047 776 B4 describes a method in which optical synchronization is not performed based on a predefined transmitter/receiver pair, but can be carried out with any transmitter/receiver pair. For this purpose, a unique identifier is assigned to each individual transmitter/receiver pair, said identifier enabling a unique association of the transmitter/receiver pair from the totality of the transmitter/receiver pairs. If a transmission beam with an associated identifier is detected by a receiver, synchronization can be performed on the basis of the unique assignment. However, said unique assignment presupposes that the transmission beams respectively differ from one another, and therefore requires a plurality of different identifiers for the individual transmitter/receiver pairs. However, this requires either that transmitter/receiver pairs are of different design, or instead that the control units in the transmitting and receiving unit are of a correspondingly complex design. Both variants increase manufacturing costs of the light grid.

DE 10 2007 059 565 B4 describes a further method, in which the transmitter/receiver pair used for the synchronization is not predefined. In this case, the synchronization is performed with the aid of a coded transmit beam, but uses the fact that there is no need for an absolute assignment of the transmit beam to a transmitter/receiver pair, but a relative assignment is already sufficient for the synchronization, that is to say on detection of the coded transmit beam at a receiver it is possible to start cyclic activation with the downstream receiver on the basis of the sequential control. In order for the coded transmit beam to be applied to different transmitter/receiver pairs, the control unit in the transmitting unit has an algorithm which emits the coded transmit beam via different transmitter/receiver pairs in a temporally varying fashion. Since the coded transmit beam continues to be applied to different transmitter/receiver pairs, blanking individual beams does not prevent synchronization taking place. In the most unfavorable instance, only several cycles are required for the synchronization. In contrast to the aforementioned methods, a single identifier differing from the others is required in these methods. However, it is disadvantageous that only a relative assignment of the coded transmit beam is possible to a transmitter/receiving pair.

SUMMARY OF THE INVENTION

Against this background, it is an object of the present invention to provide an alternative method for synchronizing light grids. It is further an object to provide a method for synchronizing light grids in a simpler manner. Yet it is further an object to provide a light grid that can be implemented more cost effectively. Still further, it is an object to provide a method for synchronizing light grids using an absolute assignment.

According to one aspect of the present invention, there is provided a method for synchronizing a light grid which has a transmitting unit with a plurality of transmitters, a receiving unit with a plurality of receivers, a transmitter control unit which activates the transmitters one after another in a cycle T, and a receiver control unit for evaluating the receivers, wherein each transmitter is associated with a receiver and an activated transmitter transmits a transmission beam to the receiver, wherein at least two transmission beams in the cycle T are synchronization transmission beams which are emitted at a time offset D from each other, wherein the receiver control unit measures the time offset D, and wherein synchronization transmission beams are uniquely associated with the totality of the transmission beams in the cycle T on the basis of the time offset D.

According to a further aspect of the present invention, there is provided a light grid comprising a transmitting unit having a plurality of transmitters, a receiving unit having a plurality of receivers, a transmitter control unit which is configured to activate the transmitters one after another in a cycle, and a receiver control unit for evaluating the receivers, wherein each transmitter is respectively associated with a receiver and, during operation, an activated transmitter transmits a transmit beam to the respectively assigned receiver, wherein at least two transmission beams in the cycle are synchronization transmission beams which are emitted at a defined time offset from each other, wherein the receiver control unit measures the time offset, and wherein the synchronization transmission beams are uniquely associated with the totality of the transmission beams in the cycle on the basis of the time offset D.

The new method and the light grid based thereon are therefore based on the idea of carrying out the synchronization in terms of time of the transmitting and receiving unit with the aid of two synchronization transmission beams, wherein the synchronization beams preferably differ from the other transmission beams applying an identifier to the synchronization transmission beams. Therefore, only two different types of transmission beams are required for the synchronization. One the one hand, these are "normal" transmission beams, that is to say transmission beams with or without an identifier, and on the other hand these are synchronization transmission beams with an identifier which deviates from the remaining transmission beams.

The synchronization is performed by evaluating the time difference between the reception of the first and at least second synchronization transmission beam. For this purpose, at first all the receivers are active and "listening for" the incoming of a synchronization transmission beam. The receiver control unit records the incoming times of the two synchronization transmission beams and calculates the time difference therefrom. The time difference, in other words the time offset, with which the synchronization transmission beams are received, are advantageously used to uniquely associated the synchronization transmission beams within the totality of the transmission beams.

Since only two different types of transmission beams are required for synchronization, a light grid for the new method can be implemented in a cost effective manner. Preferably, applying the identifier to the transmission beams and demodulating it on the receiver-side can be realized by software modules in the transmitter and/or receiver control unit. Alternatively, the identifier can be applied via polarization or other light frequency.

Furthermore, different transmitter/receiver pairs can be used for the synchronization, since only the time offset between any two synchronization transmission beams is used for the purpose of assignment. Therefore, if a transmitter/receiver pair which has been used for synchronization is eliminated for instance because of blanking, the synchronization transmission beam of another transmitter/receiver pair can be used for synchronization. The only requirement is that at least two synchronization transmission beams are received in a cycle. The availability of the light grid is thereby increased.

Finally, the new method can be used not only to determine the position of the synchronization transmission beams relative to the other transmission beams, but also to determine the absolute position of the synchronization transmission beams within the other transmission beams in a cycle T. Said additional information can advantageously be used for a better adjustment between the transmitting unit and the receiving unit.

The above named object is thus completely achieved.

In a further embodiment, the order in which the synchronization transmission beams and the transmission beams are emitted forms a defined sequence.

A defined sequence which is known to the transmitter control unit and the receiver control unit makes it particularly simple to determine an assignment with the aid of the time offset. Since there are only two possible states for a transmit beam, the sequence is formed as a simple binary sequence and can therefore be processed particularly well.

In a further embodiment, synchronization transmission beams are transmission beams with a defined identifier, wherein the other transmission beams either carry no identifier or a different one.

In accordance with said embodiment only one identifier is needed in order to distinguish transmission beams from synchronization transmission beams. This enables the light grid to be implemented particularly favorably. In this case, the identifier can be defined so clear as to exclude confusion between synchronization transmission beams and normal transmission beams.

In a further embodiment, the number M of synchronization transmission beams is selected so that by a given number N of transmitters no larger number M of synchronization transmission beams can be found at which the pairwise time offset between the synchronization transmission beams is unique.

In accordance with said embodiment, the optimum ratio of synchronization transmission beams to "normal" transmission beams is used in order to achieve the highest possible availability. The more synchronization transmission beams that occur in a cycle, the higher is the probability that at least two beams are not affected by the blanking. The allocation is preferably performed with the aid of an optimum Golomb ruler, a scale in which a distance between two scale values occurs precisely only once, wherein the total length of the scale is kept as short as possible.

In a further embodiment, the receiver unit compares the measured time offsets with reference values and depending thereof puts the light grid into an object detection mode.

In accordance with said embodiment, the object detection mode is started only when the time offset between the synchronization transmission beams corresponds to a defined reference value. This prevents a false synchronization, for example owing to a faulty receiver. Overall, said embodiment raises the reliability of the light grid.

In a further embodiment, the object detection mode begins with the transmit beam which follows the second synchronization transmit beam in the cycle T.

In accordance with said embodiment, the object detection mode begins immediately after a second synchronization transmission beam is recorded by the receiving control unit. Hence, the object detection starts in the very same cycle in which the synchronization takes place.

It goes without saying that the features explained above and those to be explained below can be used not only in the combination respectively specified, but also in other combinations or on their own, without departing from the scope of the present invention.

BRIEF DESCRIPTION OF THE DRAWINGS

Exemplary embodiments of the invention are illustrated in the drawing and will be explained in more detail in the following description. In the drawings:

FIG. 4 shows a summary table for the optimum positioning of synchronization transmission beams within a cycle, and FIG. 5 shows a schematic depiction for coding two light grids.

DESCRIPTION OF PREFERRED EMBODIMENTS

Figure 1:
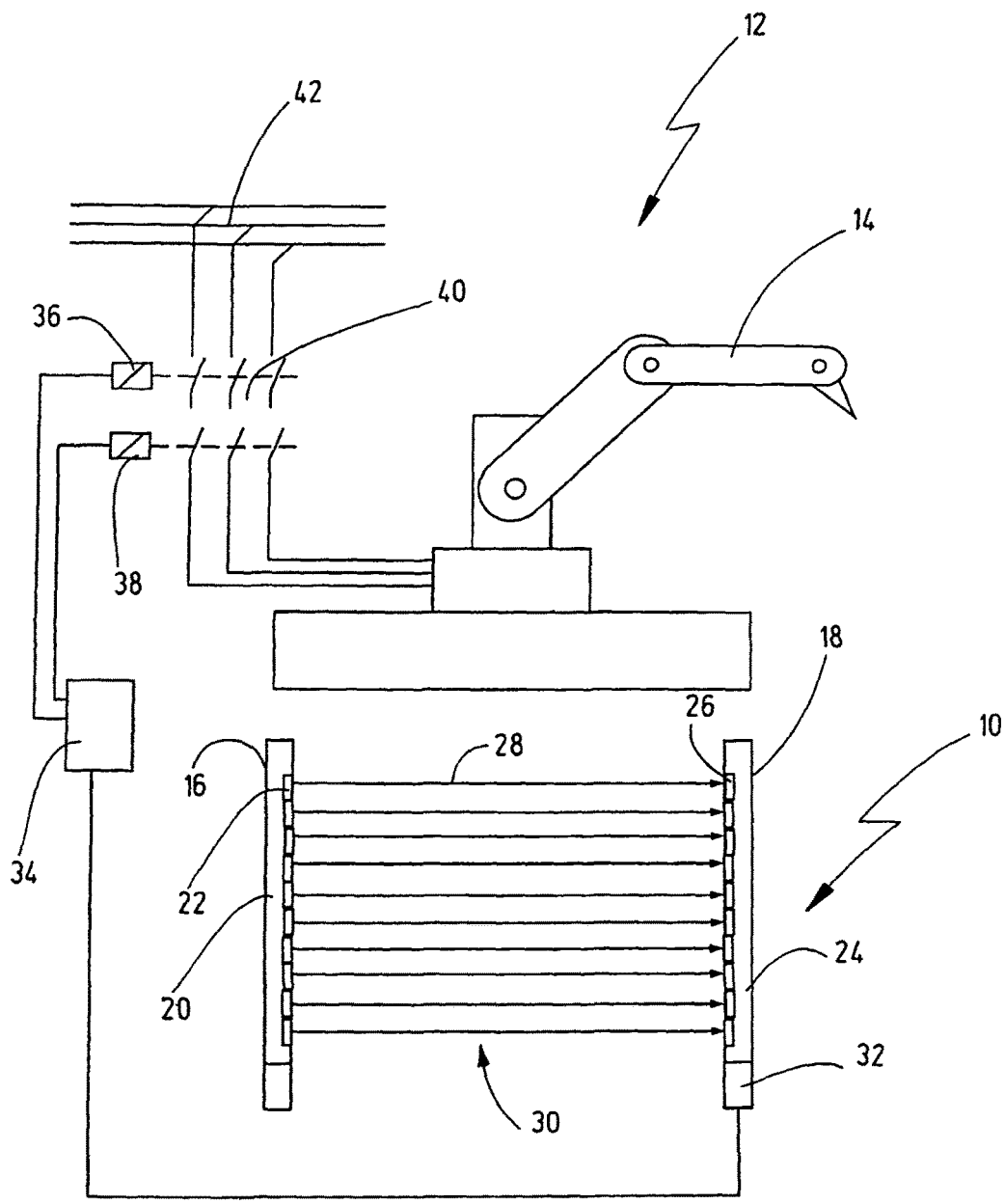
FIG. 1 shows an arrangement for protecting a technical system with a light grid.

FIG. 1 shows an example of a device according to an exemplary embodiment of the new light grid 10 for protecting a technical installation 12. Here, the technical installation 12 is a robot 14 which operates in an automated fashion and whose range of movement represents a danger zone for people. The light grid 10 is configured to detect an unauthorized entry into the danger zone and to transfer the technical installation 12 into a safe state and, in particular, to shut it down.

To this end, the light grid 10 has two components 16, 18 which are arranged at a distance from one another. The first component 16 is a transmitting unit 20 which has a plurality of individual transmitters 22. The second component 18 is a receiving unit 24 with a plurality of individual receivers 26. The two components 16, 18 each have a housing and are installed in a fixed manner in the region around the installation 12, preferably at the boundaries of the danger zone to be monitored.

Each transmitter 22 of the transmitting unit 20 is assigned a receiver 26 in the receiving unit 24 which jointly form a transmitter/receiver pair 22, 26. Preferably, the transmitters 22 are arranged at the first component 16 next to one another and in an equal distant to one another. The receivers 26 are preferably arranged in the same way next to one another and at equal distant to one another at the second component 18. A transmitter 22 of each transmitter/receiver pair 24, 26 is configured to transmit a straightened transmission beam 28 along a beam axis to the associated receiver 26. The totality of the beam axes 28, which preferably run in parallel to one another, defines a protective field 30 of the light grid 10.

The monitoring of the protective field 30 or the object detection is performed according to a scanner. The transmitter/receiver pairs 22, 26 are activated one after another, wherein the transmitter 22 transmits a transmission beam 28 to the associated receiver 26. The activation is performed in a predefined cycle, preferably in the sequence in which the individual transmitters 22 are arranged next to one another at the first component. Within a cycle T, each transmitter/receiver pair 22, 26 is activated once so that the protective field 30 is completely scanned once.

Preferably, the transmitter 22 comprises a light-emitting diode with an optical system which can emit a transmission beam 28, preferably in the form of light pulses. The receiver 26 preferably comprises a corresponding photodiode with a receiving optical system which can detect a transmission beam 28 directed onto it.

Given a free beam path between transmitter and receiver of a transmitter/receiver pair 22, 26, the transmission beam 28 emitted by the transmitter 22 is detected by the receiver 26. However, if an object is located in the beam path, the transmission beam 28 is interrupted or deflected and the transmission beam 28 is not detected by the receiver 26.

A receiver control unit 32 in the receiving unit 24 is connected to the individual receivers 26 and records the incoming or absence of one or more transmission beams 28 and generates thereof a binary object detection signal with two states. The first state indicates that no object is located in the protective field. The second state indicates the presence of an object (not represented here) or a defect that, for safety reasons, also results in a shutdown of the installation 12.

Here, the receiver control unit 32 is connected to a higher-level control unit 34 which in dependence upon the object detection signal generates a two-channel redundant release signal which is used here to drive two contactors 36, 38. The contactors 36, 38 comprise working contacts 40 which are closed only in the presence of the release signal. The working contacts 40 are arranged between a power supply 42 and the engines of the robot 14 so that the robot 14 is separated from the power supply 42 and therefore stopped upon detection of an object in the protective field 30 of the light grid 10.

As illustrated in FIG. 1, the transmitting unit 20 and the receiving unit 24 are connected to one another neither mechanically nor electrically via a line. However, the scanning operation requires synchronization in terms of time between the receiver control unit 32, which interrogates the receivers 26 cyclically, and a transmitter control unit 44 in the transmitting unit, which activates the individual transmitters 22 cyclically.

An advantageous solution for the synchronization is described by the new method which is explained in more detail with reference to FIG. 2.

Figure 2:
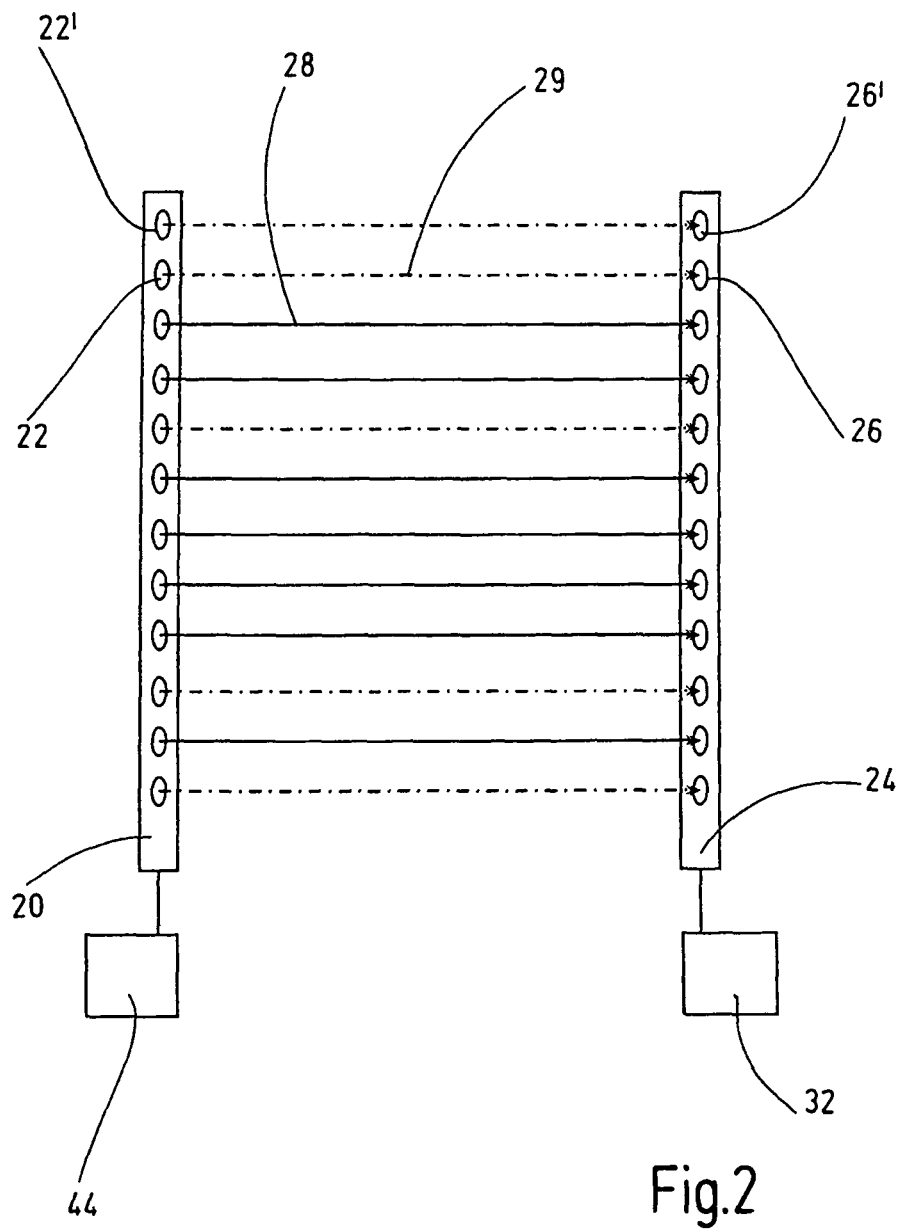
FIG. 2 shows a schematic depiction of a light grid.

FIG. 2 shows the light grid 10 according to the exemplary embodiment of FIG. 1. Here, the light grid 10 comprises twelve transmitter/receiver pairs 22, 26 whose associated transmission beams 28 are indicated by arrows. For the purpose of clarity, all the transmission beams 28 are illustrated, wherein only one transmitter/receiver pair 22, 26 is active at an instant. The activation of the transmitters 22 is performed by the transmitter control unit 44 which is illustrated here separately from the transmitting unit 20. In another exemplary embodiment, the transmitter control unit 44 may also be integrated in the transmitting unit 20. The receiving unit 24 comprises a separate receiver control unit 32 which is not connected electrically to the transmitter control unit 44.

According to the new method, the synchronization in terms of time is performed optically via the transmission beams 28. At first, the object detection is deactivated. As with the object detection, the transmitter control unit 44 activates the individual transmitters 22 one after another in the sequence of their arrangement, to transmit a transmission beam 28 to the associated receiver 26. The activation is performed in a fixed cycle with uniform interval spacing between respectively adjacent transmitters 22. In accordance with a sequence which will be explained further below, an identifier A is applied to the individual transmission beams 28 at defined time offsets so that in a cycle T a defined sequence of transmission beams 28 is emitted with or without the identifier A.

The identifier A can, for instance, be applied to the transmission beam 28 by a defined pulse sequence, double pulse, a pulse-width modulation or amplitude modulation. Preferably, the modulation is performed by the transmitter control unit 44. Alternatively, specific transmitters 22 can also be designed so that they always apply the identifier A to a transmission beam 28. In this case, the defined time offset which is required between the emissions of the transmission beams with the identifier A in order to form the sequence is defined by the corresponding arrangement of the transmitters 22 in the sequence of the transmitters 22.

In FIG. 2, the transmission beams 28, which are assigned an identifier A, are represented by dashed and dotted arrows. Transmission beams which are assigned an identifier A are denoted below as synchronization transmission beams 29. Assuming that activation begins at the first transmitter 22' and continues in the scanning direction R, it follows that for the exemplary embodiment illustrated here there is a sequence over the cycle T of ABBBABBBBABA, A standing for a transmission beam with applied identifier A, and B standing for a transmit beam without identifier or an identifier B which differs from the identifier A.

In the case of the receiving unit 24, all receivers 26 are firstly active, that is to say the receiver control unit 32 "listens" on all the receivers 26 as to whether a transmission beam 28 is recorded. In particular, it listens to synchronization transmission beams 29, that is to say transmission beams 28 with an identifier A. In order to detect synchronization transmission beams 29, the receiver control unit 32 is configured to demodulate the identifier of a transmission light beam. Alternatively, a transmitter/receiver pair 22, 26 can also be configured so that the transmitter 22 always emits only one transmit beam with an identifier A and the receiver can detect the transmission beam 28 only when said beam carries the identifier A.

If the receiver control unit records a synchronization transmission beam 29 at a receiver 26, said instant is stored by the receiver control unit 32, or alternatively a timer is started. If the receiver control unit 32 records a second synchronization transmission beam 29 at another receiver, said instant is also kept or the timer is stopped. The receiver control unit can use the time difference between the incoming of the first and of the second synchronization transmission beams 29 to determine exactly which two transmission beams 28 from the sequence 46 are involved. The receiver control unit is only aware of the transmitter/receiver pair 22', 26' at which the sequence 46 normally begins, and of how the sequence 46 is defined, that is to say in which sequence transmitter beams 28 and synchronization transmission beams 29 follow one another in a cycle T, for instance ABBBABBBBABA.

The receiver control unit can consequently derive therefrom which transmitter 22 is activated next in the sequence 46, and begin the cyclical interrogation of the individual receivers 26. At the same time, the object detection is activated by the receiver control unit 32 so that the light grid 10 can perceive its actual task.

How the sequence 46 is to be selected using the method according to the invention is explained in more detail with reference to FIG. 3. The sequence 46 is advantageously selected here such that a unique association of the at least two received synchronization transmission beams 29 can even be achieved when the sequence 46 has not been received entirely in one cycle T, for instance because some transmission beams 28 are eliminated by blanking.

Figure 3:
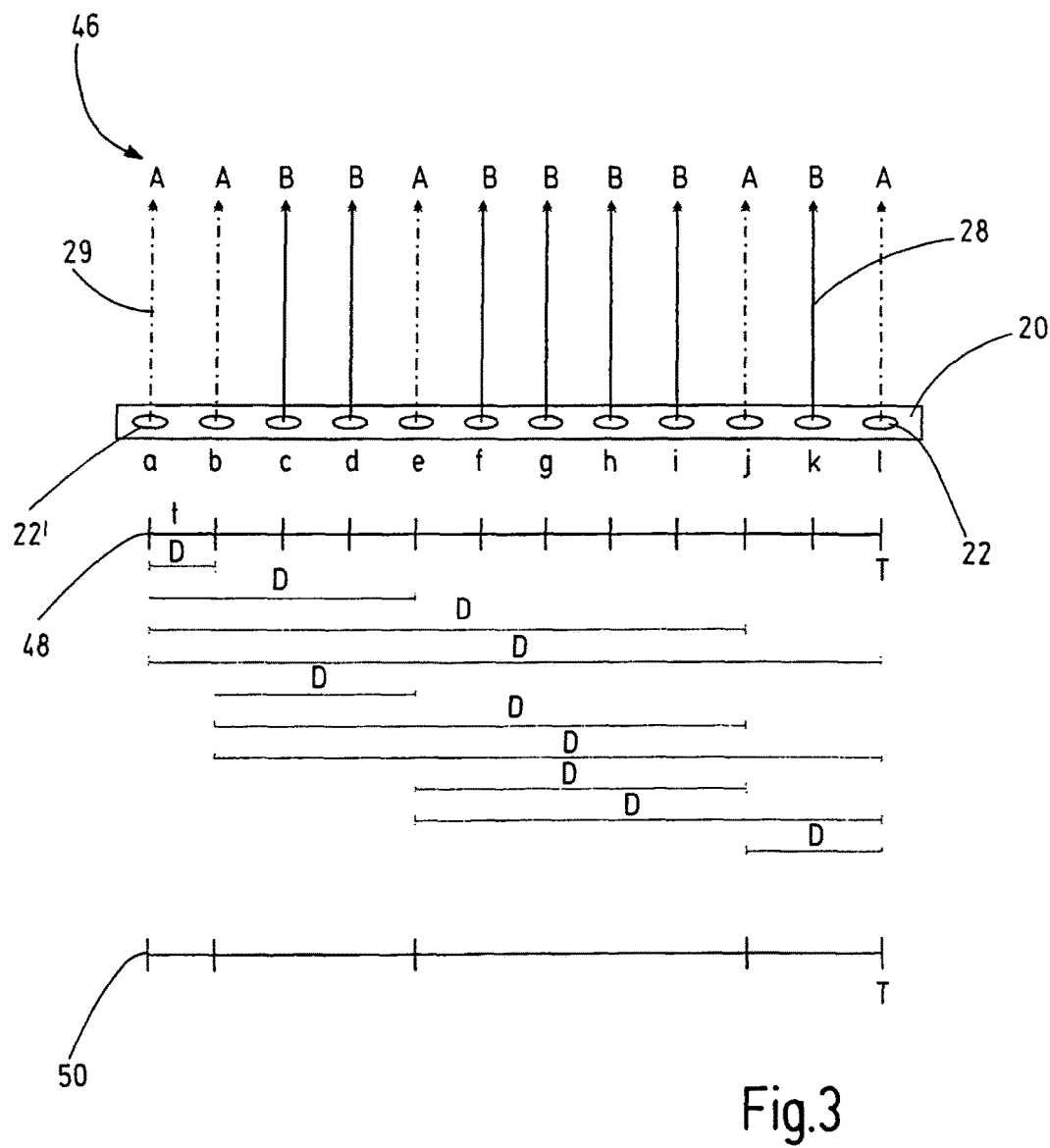
FIG. 3 shows a transmitting unit of a light grid for using the method according to the invention.

FIG. 3 in this regard shows the transmitting unit 20 with the transmission beams 28 according to the exemplary embodiment of FIG. 2.

Below the transmitting unit 20 a time axis on which the cycle T is plotted is indicated by the reference numeral 48. The time axis 48 is subdivided into uniform segments t in accordance with the number of transmitters 22 of the transmitting unit 20. The marks on the time axis 48 correspond to the instants at which a transmitter 22 respectively emits a transmission beam 28.

Beginning with the transmitter 22', which is arranged at the outermost end, the transmitters 22 are sequentially activated one after another. The respective position of a transmitter/receiver pair is specified with the aid of reference symbols a to l. Since the activation is performed sequentially, the assignment a to l also corresponds to the sequence in terms of time in which the transmission beams are emitted in the cycle T. The transmission beams at the positions a, b, e, j and l are synchronization transmission beams 29 and are respectively assigned an identifier A. The other transmission beams 28 bear either no identifier or an identifier B different from A. The complete sequence 46 over the cycle T therefore corresponds to the pattern ABBBABBBBABA, wherein the time offset between the individual transmission beams 28 corresponds to the offset t.

The individual time offsets D, which occur in pairs between the synchronization transmission beams 29, are illustrated below the time axis 48. The offsets are respectively a multiple of the offset t. The sequence in which the synchronization transmission beams are emitted is selected so that the time offset D is unique, in other words a time offset D between two synchronization transmission beams can only occur in cycle T exactly once. For example, the time offset D between the emission of the synchronization transmission beam 29 at position b and the emission of the synchronization transmission beam 29 at position e corresponds to three time units of duration t. The cycle T does not include any further two pairs of synchronization transmission beams 29 whose instants of emission are offset with a time offset 3t. If the receiving unit (not illustrated here) receives a first synchronization transmission beam 29 and a second synchronization transmission beam 29 at a time offset 3t, there is no doubt that the synchronization transmission beam 29 of positions b and e is involved.

Since the transmitter control unit 44 activates the transmitter/receiver pairs sequentially, it follows therefrom that the transmit beam in position f is transmitted in the next interval step. Thus, starting with the transmitter/receiver pair 22, 26 at the position f the receiving unit 24 can begin with the cyclic evaluation and the object detection can be activated.

A precondition for the synchronization is therefore only that the receiving unit 24 receives at least two synchronization transmission beams 29 in a cycle T. It is of no relevance that there are between said two synchronization transmission beams 29 further synchronization transmission beams 29 that are, however, eliminated because of blanking, since only the time difference between the receiving instants of the synchronization transmission beams 29 is relevant. Therefore, synchronization transmission beams 29 in the sequence 46 can be deliberately eliminated, for example by blanking. Thus, in the previous example in case the transmit beam at position e was covered, the receiving unit 24 would have detected the transmit beam at position j as next synchronization transmission beam 29. In this case, the time difference is 8t. However, such an offset can occur according to the definition only between the transmission beams at positions b and j. Still, the receiving unit 24 can detect which synchronization transmission beam 29 of the sequence 46 is involved.

It goes without saying that the light grid 10 shown in FIG. 3 can be extended by further transmitter/receiver pairs 22, 26, which also extends the cycle T. All that is relevant for the synchronization according to the new method is that the time offsets between the synchronization transmission beams 29 are unique in one cycle.

The more synchronization transmission beams 29 that are used in a cycle T, the greater is the probability of a rapid synchronization of the light grid 10 and the higher is the availability of the light grid 10. A maximum number M of synchronization transmission beams is, however, limited by the total number N of the transmitter/receiver pairs, in other words given a specific number of transmitter/receiver pairs there is a maximum number M of synchronization transmission beams 29 which can be distributed over the cycle T so that the time offset D between the synchronization transmission beams 29 is unique.

In order to determine the maximum number M of synchronization transmission beams, a further time axis 50 of length T is illustrated in FIG. 3. Onto said time axis 50, there have been transferred only the marks of the first time axis 48 at which a synchronization transmission beam 29 is emitted. The time axis 50 illustrated corresponds to a so-called Golomb ruler, which is a scale that has no two marks at integer positions at the same distance from one another.

Golomb rulers are categorized by their order and their length. The order of a Golomb ruler is defined by the number of marks, and the length is defined by the longest spacing of two marks. Transferred to the light grid 10, the number of the marks corresponds to the number M of the synchronization transmission beams 29, and the length corresponds to the cycle T. The integer positions correspond to the individual transmit instants (a to l).

It is not necessary for a Golomb ruler 50 to be able to measure all distances up to its length, that is to say all the distances between all the marks—arranged in ascending fashion—to yield a row of numbers without gaps. Furthermore, a Golomb ruler 50 is said to be optimum when there are no shorter rulers of the same order. Referring to the light grid 10, this means that the maximum number M of synchronization transmission beams 29 can be determined from the calculation of optimum Golomb rulers. Conversely, a specific number $N_{min}$ of transmitter/receiver pairs 22, 26 is required for a specific number M of synchronization transmission beams 29.

FIG. 4 shows a table with possible values for the maximum number M of synchronization transmission beams 29, and the associated minimum number $N_{min}$ of transmitter/receiver pairs 22, 26. The values in the third column show by way of example how the synchronization transmission beams 29 can be arranged within a sequence 46.

With reference to FIG. 5, there is explained in detail how two of the previously described light grids can be operated in the immediate vicinity of one another, without the light grids disturbing or influencing one another. The procedure described below is to be used with particular preference in conjunction with the light grids according to the invention, but may also be for other light grids. Therefore, an independent idea for avoiding disturbances between two adjacent light grids is described without the need of separate coding for the individual transmission beams.

This is achieved by varying the cycle lengths T of the individual light grids. For light grids, the cycle T depends on the number of the transmission beams, and so relatively short light grids with few transmission beams have a shorter cycle than relatively long light grids. If a long light grid and a short one are used next to one another, it is possible for the large light grid to be disturbed by the more frequently transmitting short light grid in a specific region.

In order to reduce said disturbance, in the case of light grids of different lengths the cycle of at least one light grid is firstly manipulated so that the cycles of the adjacent light grids are of equal length. The cycle is therefore independent of the light grid length. The result of adapting the transmit cycles is that the transmit instants at which the short light grid emits transmission beams 28 coincide only seldom or, with particular preference, not at all with the transmit instants of the long light grid, and so crosstalk between the light grids is diminished.

If the cycles of the adjacent light grids are of equal length, the cycle of one or both light grids can be changed to a different offsets to further improve the disturbance susceptibility. In other words the cycle lengths of the light grids are deliberately offset from one another. As explained in more detail with reference to FIG. 5, the overlapping can be further reduced by choosing a specific offset.

With reference to FIG. 5, the transmit instants at which a first light grid A and a second light grid B emit transmission beams are illustrated by two synchronous time axes 100, 102, which are respectively subdivided into uniform base intervals $t_B$. On the first time axis 100, the transmit instants of the transmission beams 28 of the first light grid A are shown, while on the second time axis 102 the transmit instants of the transmission beams 28 of the second light grid B are shown. The two light grids A and B respectively emit in a cycle T two transmission beams which are mutually offset at a time offset t. The time offset t corresponds to a multiple $N_F$ of the base interval $t_B$. $N_F$ is in this example equal to 6.

$$t = N_F \cdot t_B$$

Advantageously, the transmit instants of the two light grids A and B are mutually offset from one another so that the light grids A and B do not influence one another. This is of particular interest when the light grids A and B are mounted close to one another. In order for the transmit instants of the two light grids to be offset asynchronously from one another, the cycle T of each of the two light grids is extended by an offset $\Delta A$ or $\Delta B$ in the form of a pause. The cycle $T_A$ of the first light grid A is thus the cycle T extended by the offset ΔA, and the cycle $T_B$ of the second light grid corresponds to the cycle T extended by the offset ΔB.

$$T_A = T + \Delta A$$

$$T_B = T + \Delta B$$

The offsets (ΔA, ΔB) likewise correspond here to an integer multiple ($N_{\Delta A}$, $N_{\Delta B}$) of the base interval $t_B$.

$$\Delta A = N_{\Delta A} \cdot t_B$$

$$\Delta B = N_{\Delta B} \cdot t_B$$

To produce an offset between two light grids, that is to say for the light grids not to transmit synchronously, the offsets (ΔA, ΔB) must differ from one another. Furthermore, the offsetting by the offsets (|ΔA−ΔB|) should be unequal and preferably lower than the time offset between two adjacent transmission beams 28. In addition, the offset must be at least greater than twice the base distance $t_B$ so that the beams are not constrained to coincide in later passes. It is therefore advantageous when the following relationships are valid:

$$\Delta A \neq \Delta B$$

$$2t_B \leq |\Delta A - \Delta B| \leq (N_F - 2) \cdot t_B$$

The offset occurs with each pass of the cycle, that is to say the cycles T of the two light grids are offset from one another by |ΔA−ΔB| with each turn. Therefore, a collision 104 of transmission beams, that is to say a simultaneous transmission, comes about in the turn in which the cycles are offset from one another such that the sum of the offset portions equally corresponds to an offset between the transmission beams. An offset between the transmission beams is, firstly, the offset t and, secondly, the offset of the transmission beams between the cycles caused by the offsets ΔA and ΔB.

The turn in which a collision occurs can be determined by suitable selection of the offsets ΔA, ΔB and the offset t, that is to say the integer parameters $N_{\Delta A}$, $N_{\Delta A}$ and $N_F$. In preferred implementations, a selection can be made such that a time overlap of transmission beams of two light grids occurs, depending on the implementation, at most at specific number of signal cycles. In the event of inaccurate clock generators, said probability is even much lower, but it is possible with this procedure to specify a reliable upper limit for the possible number of overlaps when using high quality clock generators.

Referring to the example of FIG. 5, a collision can occur after the third turn that is to say that after the third turn the summed offset |ΔA−ΔB| corresponds to the offset t between the transmission beams. The offset is equal to $2t_B$ with ΔA being equal to $1t_B$ and ΔB being equal to $3t_B$, and at the third turn $6t_B$ the offset corresponds to the offset of $6t_B$ of two transmission beams.

As already mentioned before, the coding of two light grids according to such a procedure is not only applicable to light grids whose synchronization is performed in accordance with the method according to the invention, but also for light grids with alternative synchronization. In the case of synchronization in accordance with the method according to the invention, in addition to said coding of the light grids it is also alternatively possible to perform coding in such a way that the light grids to be coded use different regions of a common Golomb ruler.

What is claimed is:

1. In a light grid comprising a transmitting unit having a fixed number of transmitters and a receiving unit having a fixed number of receivers, wherein each receiver is associated to one transmitter, a method for synchronizing the transmitters with the receivers in terms of time such that in an operating mode each receiver is activated simultaneously with the respective transmitter, the method comprising the steps of:
    defining a basic transmission interval for transmitting a respective transmission beam from a respective transmitter to an associated receiver,
    defining a set of unique time intervals each being a different multiple of the basic transmission interval,
    defining a first transmission beam type identifier and a second transmission beam type identifier that is different from the first transmission beam type identifier,
    assigning to each transmitter either the first or the second transmission beam type identifier,
    forming a complete set of distinct pairs of transmitters from the transmitters to which the first transmission beam type identifier is assigned,
    assigning each unique time interval from the set of unique time intervals to a pair of transmitters from the set of distinct pairs of transmitters,
    activating the receivers for the reception of transmission beams from the transmitters,
    activating the transmitters one after another in the basic transmission interval to transmit a respective transmission beam according to the assigned transmission beam type identifier,
    recording a first instant and a second instant of receiving a transmission beam according to the first transmission beam type identifier,
    determining a time difference between the first and the second instant,
    comparing the time difference with the set of unique time intervals to determine a matching time interval,
    determine a first pair of transmitters from the set of distinct pairs of transmitters associated with the matching time interval,
    switching the light grid into the operating mode after the first pair of transmitters has been determined.

2. The method of claim 1, wherein a first number M is defined by the number of transmitters to which the first transmission beam type identifier is assigned,
    wherein a second number N corresponds to the fixed number of transmitters,
    wherein a relationship between the first number M and the second number N is defined according to an optimal Golomb scale.

* * * * *